United States Patent
Sloane et al.

(10) Patent No.: US 11,165,587 B2
(45) Date of Patent: *Nov. 2, 2021

(54) SYSTEM FOR AUTHORIZING RESOURCE REQUESTS BASED ON CRYPTOGRAPHIC COMPUTATIONS AND FEDERATED HASH VERIFICATIONS

(71) Applicant: Bank of America Corporation, Charlotte, NC (US)

(72) Inventors: Brandon Sloane, Santa Barbara, CA (US); Wendell Allen Jenkins, Clover, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/701,817

(22) Filed: Dec. 3, 2019

(65) Prior Publication Data

US 2021/0167965 A1 Jun. 3, 2021

(51) Int. Cl.
*H04L 29/06* (2006.01)
*H04L 9/32* (2006.01)

(52) U.S. Cl.
CPC .......... *H04L 9/3236* (2013.01); *H04L 9/3271* (2013.01)

(58) Field of Classification Search
CPC ............................ H04L 9/3236; H04L 9/3271
See application file for complete search history.

(56) References Cited

U.S. PATENT DOCUMENTS

| | | | |
|---|---|---|---|
| 7,640,338 B2 | 12/2009 | Huitema et al. | |
| 8,677,486 B2 | 3/2014 | Olney et al. | |
| 8,776,229 B1 | 7/2014 | Aziz | |
| 8,793,787 B2 | 7/2014 | Ismael et al. | |
| 8,984,113 B2 | 3/2015 | Li et al. | |
| 9,319,404 B2 | 4/2016 | Svigals | |
| 9,392,018 B2* | 7/2016 | Adams | H04L 47/808 |
| 9,392,446 B1* | 7/2016 | Paczkowski | H04L 9/3236 |
| 9,485,231 B1 | 11/2016 | Reese | |
| 9,565,192 B2 | 2/2017 | Chillappa et al. | |
| 9,591,016 B1 | 3/2017 | Palmieri et al. | |
| 9,699,659 B2 | 7/2017 | Zehavi et al. | |
| 9,699,814 B2 | 7/2017 | Zakaria et al. | |
| 9,716,595 B1 | 7/2017 | Kravitz et al. | |
| 9,729,528 B2 | 8/2017 | Zakaria et al. | |
| 9,825,921 B2 | 11/2017 | Reese | |
| 10,887,107 B1* | 1/2021 | Chan | H04L 9/3236 |

(Continued)

*Primary Examiner* — Thaddeus J Plecha
(74) *Attorney, Agent, or Firm* — Michael A. Springs; Moore & Van Allen PLLC; Seongun M. Hong

(57) ABSTRACT

A system provides authorization of resource requests based on cryptographic computations and federated hash verifications. In particular, the system may receive requests for resources or processes from external devices. In response, the system may require that the external device complete additional authorization steps (e.g., a cryptographic computation) before being granted access to the resources or processes. The system may further federate the cryptographic computations across multiple external devices, thereby distributing the computing load that would otherwise be processed by internal systems. In this way, the system may prevent unauthorized or unintended access to the system's resources or processes.

14 Claims, 3 Drawing Sheets

(56) References Cited

U.S. PATENT DOCUMENTS

| | | | |
|---|---|---|---|
| 2010/0031315 A1* | 2/2010 | Feng | H04L 63/1458 |
| | | | 726/3 |
| 2015/0339486 A1* | 11/2015 | Shetye | G06F 21/6218 |
| | | | 726/28 |
| 2016/0080413 A1 | 3/2016 | Smith et al. | |
| 2016/0173495 A1 | 6/2016 | Joo | |
| 2016/0248746 A1 | 8/2016 | James et al. | |
| 2016/0352685 A1 | 12/2016 | Park | |
| 2016/0366181 A1 | 12/2016 | Smith et al. | |
| 2017/0066399 A1 | 3/2017 | Villacres Mesias et al. | |
| 2017/0163444 A1 | 6/2017 | McLaughlin et al. | |
| 2017/0289184 A1* | 10/2017 | C et al. | |
| 2018/0183601 A1* | 6/2018 | Campagna | H04L 63/1441 |
| 2021/0194702 A1* | 6/2021 | Roscoe | H04L 9/0894 |

* cited by examiner

SYSTEM FOR AUTHORIZING RESOURCE REQUESTS BASED ON CRYPTOGRAPHIC COMPUTATIONS AND FEDERATED HASH VERIFICATIONS

FIELD OF THE INVENTION

The present disclosure embraces a system for authorizing resource requests based on cryptographic computations and federated hash verifications.

BACKGROUND

There is a need for a way to prevent unauthorized and/or unnecessary strains to computing systems and resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for authorizing resource requests based on cryptographic computations and federated hash verifications. In particular, the system may receive requests for resources or processes from external devices. In response, the system may require that the external device complete additional authorization steps (e.g., a cryptographic computation) before being granted access to the resources or processes. The system may further federate the cryptographic computations across multiple external devices, thereby distributing the computing load that would otherwise be processed by internal systems. In this way, the system may prevent unauthorized or unintended access to the system's resources or processes.

Accordingly, embodiments of the present disclosure provide a system for authorization of resource requests using cryptographic computations. The system may comprise a memory device with computer-readable program code stored thereon; a communication device; and a processing device operatively coupled to the memory device and the communication device. The processing device may be configured to execute the computer-readable program code to receive, from a user computing system, a request to access a resource or process; assess a magnitude of potential impact of the request to access the resource or process; based on the magnitude of potential impact, prompt the user computing system to complete one or more authorization steps; detect that the user computing system has completed the one or more additional authorization steps; and grant the request to access the resource or process.

In some embodiments, the one or more authorization steps comprises computing a solution to a cryptographic challenge, wherein the detecting that the user computing system has completed the one or more authorization steps comprises receiving the one or more hash values from the user computing system; inputting the solution into a hash algorithm to generate a hash output; and verifying that the hash output satisfies a set of criteria for the cryptographic challenge.

In some embodiments, the set of criteria for the cryptographic challenge comprises a requirement that a value of the hash output is lower than a predefined threshold.

In some embodiments, prompting the user computing system to complete the one or more authorization steps comprises prompting the user computing system to compute a set of cryptographic hash values, the set comprising a first subset and a second subset, wherein the detecting that the user computing system has completed the one or more authorization steps comprises computing hash values for the first subset to produce known hash output values; receiving, from the user computing system, the set of cryptographic hash values; and comparing the set of cryptographic hash values with the known hash output values.

In some embodiments, the computer-readable program code further causes the processing device to perform integrity verification of one or more data files by comparing the set of cryptographic hash values with one or more corresponding stored hash values.

In some embodiments, the computer-readable program code further causes the processing device to prompt a user associated with the user computing system to complete an additional authorization step.

In some embodiments, the computer-readable program code further causes the processing device to scale a difficulty of the one or more authorization steps depending on a difficulty of granting the request to access the resource or process.

Embodiments of the present disclosure also provide a computer program product for authorization of resource requests using cryptographic computations. The computer program product may comprise at least one non-transitory computer readable medium having computer-readable program code portions embodied therein, the computer-readable program code portions comprising executable code portions for receiving, from a user computing system, a request to access a resource or process; assessing a magnitude of potential impact of the request to access the resource or process; based on the magnitude of potential impact, prompting the user computing system to complete one or more authorization steps; detecting that the user computing system has completed the one or more additional authorization steps; and granting the request to access the resource or process.

In some embodiments, the one or more authorization steps comprises computing a solution to a cryptographic challenge, wherein the detecting that the user computing system has completed the one or more authorization steps comprises receiving the one or more hash values from the user computing system; inputting the solution into a hash algorithm to generate a hash output; and verifying that the hash output satisfies a set of criteria for the cryptographic challenge.

In some embodiments, the set of criteria for the cryptographic challenge comprises a requirement that a value of the hash output is lower than a predefined threshold.

In some embodiments, prompting the user computing system to complete the one or more authorization steps comprises prompting the user computing system to compute a set of cryptographic hash values, the set comprising a first subset and a second subset, wherein the detecting that the user computing system has completed the one or more authorization steps comprises computing hash values for the first subset to produce known hash output values; receiving, from the user computing system, the set of cryptographic hash values; and comparing the set of cryptographic hash values with the known hash output values.

In some embodiments, the computer-readable program code portions comprising executable code portions for performing integrity verification of one or more data files by comparing the set of cryptographic hash values with one or more corresponding stored hash values.

In some embodiments, the computer-readable program code portions further comprise executable code portions for prompt a user associated with the user computing system to complete an additional authorization step.

Embodiments of the present disclosure also provide a computer-implemented method for authorization of resource requests using cryptographic computations. The method may comprise receiving, from a user computing system, a request to access a resource or process; assessing a magnitude of potential impact of the request to access the resource or process; based on the magnitude of potential impact, prompting the user computing system to complete one or more authorization steps; detecting that the user computing system has completed the one or more additional authorization steps; and granting the request to access the resource or process.

In some embodiments, the one or more authorization steps comprises computing a solution to a cryptographic challenge, wherein the detecting that the user computing system has completed the one or more authorization steps comprises receiving the one or more hash values from the user computing system; inputting the solution into a hash algorithm to generate a hash output; and verifying that the hash output satisfies a set of criteria for the cryptographic challenge.

In some embodiments, the set of criteria for the cryptographic challenge comprises a requirement that a value of the hash output is lower than a predefined threshold.

In some embodiments, prompting the user computing system to complete the one or more authorization steps comprises prompting the user computing system to compute a set of cryptographic hash values, the set comprising a first subset and a second subset, wherein the detecting that the user computing system has completed the one or more authorization steps comprises computing hash values for the first subset to produce known hash output values; receiving, from the user computing system, the set of cryptographic hash values; and comparing the set of cryptographic hash values with the known hash output values.

In some embodiments, the method further comprises performing integrity verification of one or more data files by comparing the set of cryptographic hash values with one or more corresponding stored hash values.

In some embodiments, the method further comprises prompting a user associated with the user computing system to complete an additional authorization step.

In some embodiments, the method further comprises scaling a difficulty of the one or more authorization steps depending on a difficulty of granting the request to access the resource or process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
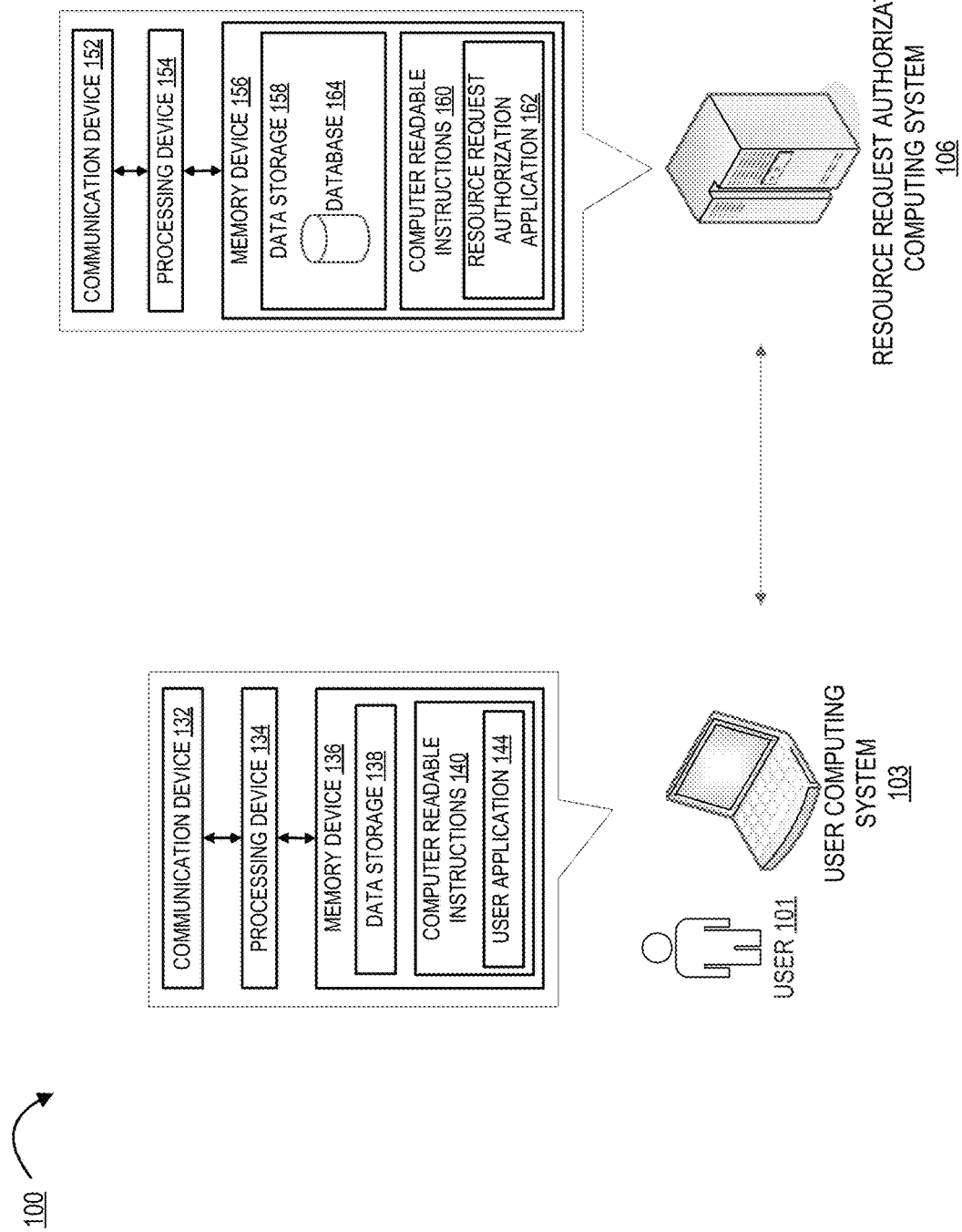
Figure 2:
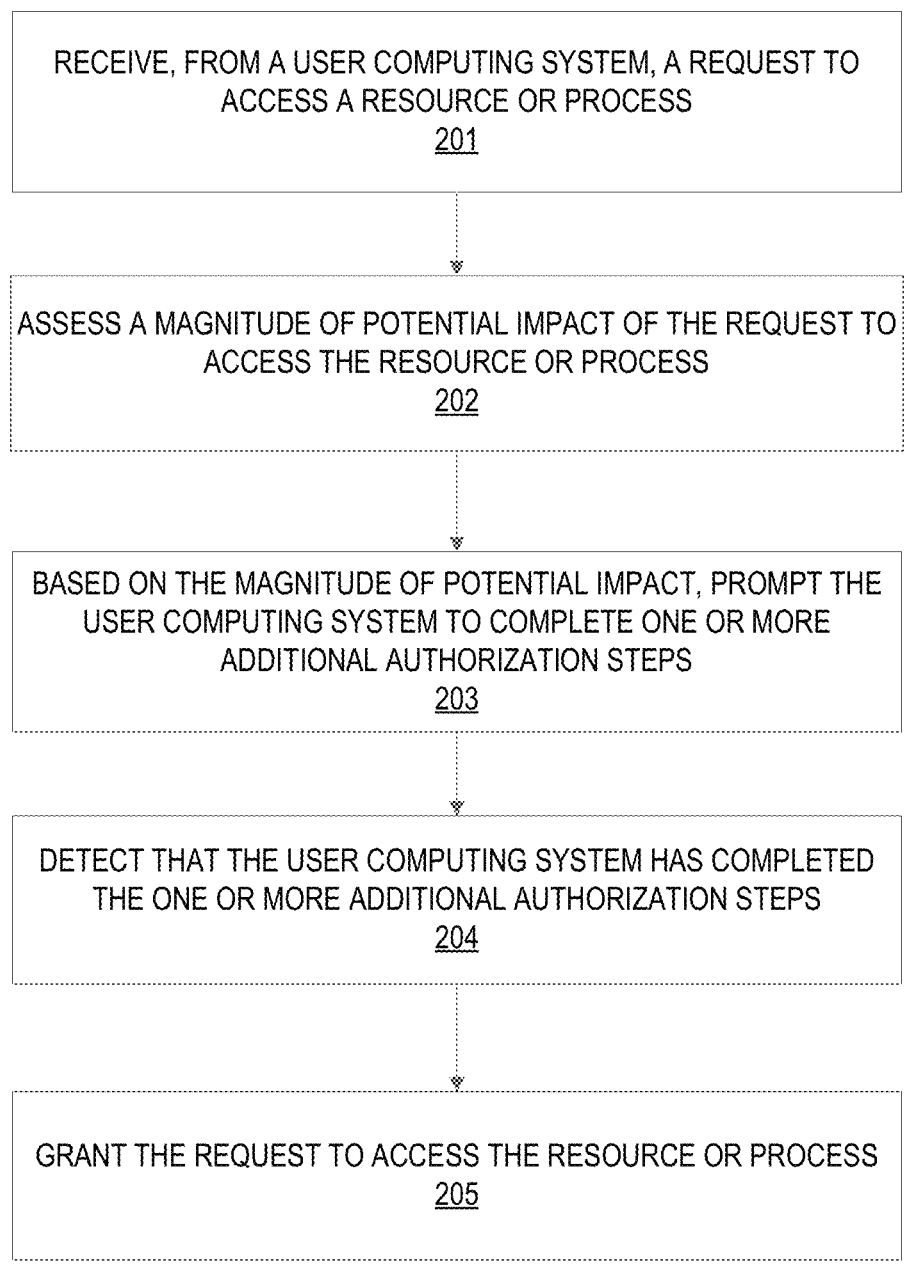
Figure 3:
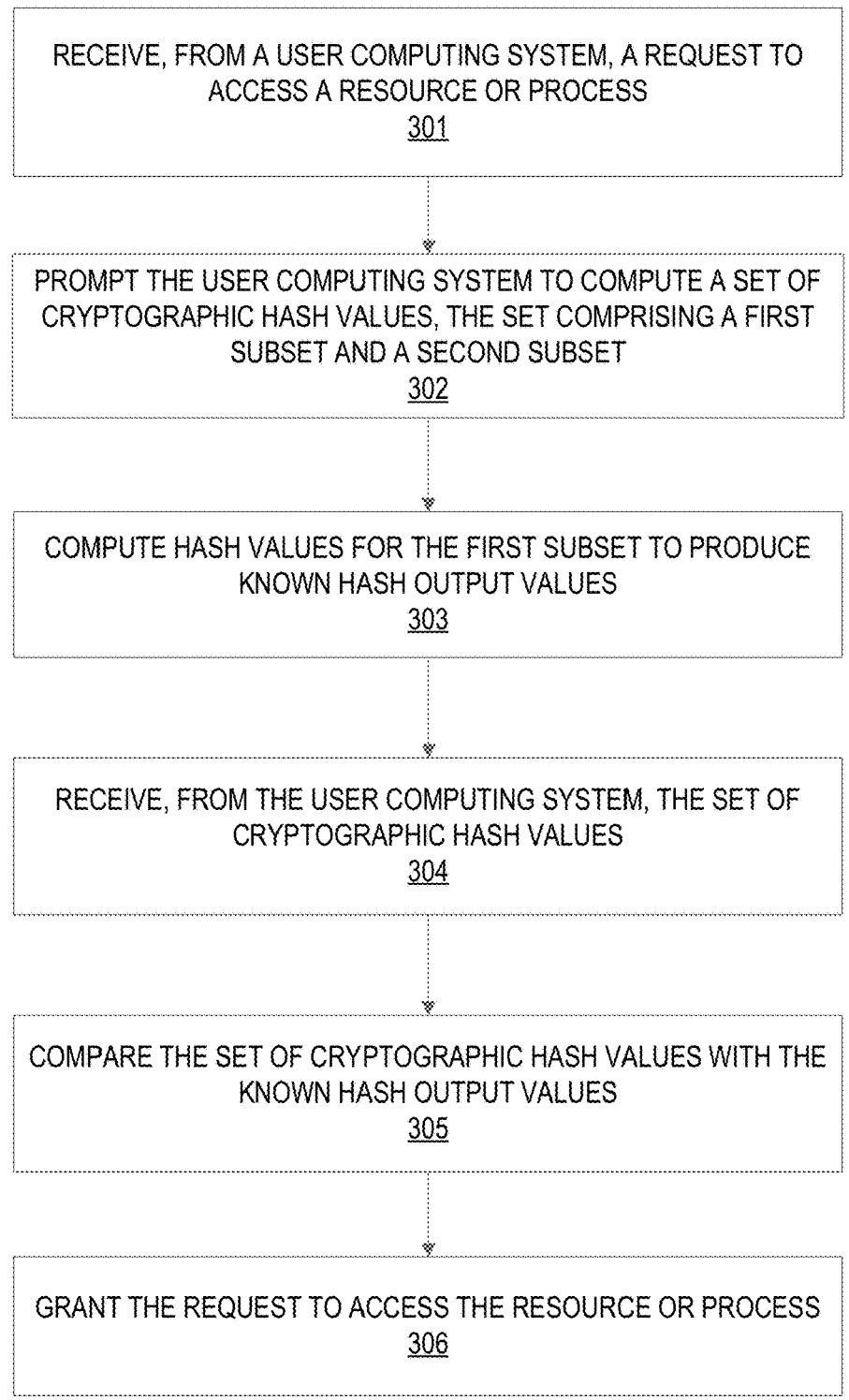

Having thus described embodiments of the invention in general terms, reference will now be made to the accompanying drawings, wherein:

FIG. 1 illustrates an operating environment for the resource request authorization system, in accordance with one embodiment of the present disclosure;

FIG. 2 illustrates a process flow for performing authorization of resource requests, in accordance with some embodiments of the present disclosure; and FIG. 3 illustrates a process flow for redistributing computing loads to external systems, in accordance with one embodiment of the present disclosure

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

An entity's system may be configured to execute certain processes and/or grant access to resources in response to requests received from users over a network. For instance, a user may request access to view or download certain data files stored on a networked server. In other embodiments, the user may request certain functions or processes are executed by the network (e.g., moving data from one database to another). That said, an entity may wish to protect against unauthorized or unintentional access to an entity's resources. In this regard, the system may assess the magnitude of potential impact of the requested action on the entity's systems (e.g., networking load, processing or storage load, potential security issues, potential for data loss, or the like) and, depending on the potential impact, require the user to take one or more additional authorization steps before fulfilling the request. The additional authorization step may be, for instance, a requirement that the requesting computing system complete a cryptographic computation or challenge (e.g., a Proof of Work calculation), where the difficulty of the calculation may change depending on the magnitude of the potential impact of the request. For example, the cryptographic computation may include a requirement that the requesting computing system find a nonce value that, when processed through a hash algorithm with a certain given value, produces a fixed-length hash output that is below a certain defined threshold. Higher difficulty settings may lower the defined threshold, while lower difficulty settings may raise the defined threshold. In this regard, the difficulty level may be a whole number which defines the number of leading zeroes that must be present in the hash output in order to complete the cryptographic computation.

In some embodiments, the system may scale the additional authorization step to multiple different users and/or multiple different authorization steps. For example, the system may require that multiple cryptographic challenges are completed by the requesting user or computing system to fulfill the request. In this regard, the system may require the requesting computing system to compute multiple different hash output values, where a portion of the hash output values may be known by the system and another portion of the hash output values may be unknown or uncertain. By forcing the requesting computing system to perform computations of known values as well as unknown values, the system may offload internal computing workloads (e.g., integrity validation checks) to external requesting systems.

Exemplary use cases are provided below for illustrative purposes. In one exemplary embodiment, the system may receive a request from a user to download one or more data files with a large total file size from the entity's servers (e.g., a request to download all of the images on a particular webserver). Before fulfilling the user's request and granting access to the data files, the system may assess the potential impact of fulfilling the request. For instance, the system may calculate a potential impact score based on the potential strain on computing resources of the request to download a large number of data files (e.g., processor usage, memory usage, I/O calls, networking bandwidth, and the like). If the potential impact score is above a certain threshold, the system may first require the requesting computing system to perform a Proof-of-Work computation (e.g., calculate a nonce value that produces a hash output within the acceptable parameters). Once the requesting computing system has calculated the solution, the system may be confident that the original request was genuine and valid. The system may then authorize the transfer of the data files to the requesting computing system.

In another embodiment, the system may receive a request from a user to wipe all of the data files within a particular database. In such embodiments, the system may, alternatively or in addition to posing a challenge to the requesting computing system, require the user to carry out an additional authorization step (e.g., the user must solve a geometric or mathematical puzzle). Once the user has successfully completed the additional authorization step, the system may proceed with fulfilling the user's request. By requiring the user to carry out the additional authorization step, the system may prevent accidental or unintentional actions that may create disproportionately large impacts on the entity's systems.

In yet another embodiment, the system may wish to perform integrity verifications of data files within a database by inputting the data files into a hash algorithm and cross-referencing the hash output with a corresponding stored hash value which may be generated upon entry of the data file into the database. If the hash values match, the system may be able to verify that the data file within the database has not been altered from its original state as it existed at the time of creation (or last update). In this regard, when the system receives requests from requesting computing systems for access to certain resources or processes, the one or more authorization steps may comprise a requirement that the requesting computing system perform one or more hash verifications of the data files in the database. For instance, the system may require that the requesting computing system perform 10 different hash verifications for 10 different data files. In such an embodiment, the system may calculate a portion of the 10 data files, but not the others (e.g., 4 of the 10). Upon receiving the 10 hash verifications from the requesting computing system, the system may compare the values of the received hash verifications with the 4 known hash values (e.g., the values computed by the entity system). If all 4 values match, the system may be confident that the remaining 6 hash verifications were properly performed by the requesting computing system. In this way, the system may be able to offload processing tasks to external computing systems, thereby increasing the processing efficiency of the internal computing systems and associated network connections.

The system as described herein confers a number of technological advantages over conventional authorization systems. In particular, by assessing the potential impact of certain requests to access resources and/or processes, the system may help prevent computing inefficiencies, instabilities, and data loss issues that may result from unauthorized and/or unintended user actions (e.g., denial of service attempts). Furthermore, the ability to offload computing workloads to external systems may allow the system to increase the computing efficiency (e.g., processing load, memory usage, I/O calls, networking bandwidth, and the like) of internal computing systems within the network environment.

Turning now to the figures, FIG. 1 illustrates an operating environment 100 for the resource request authorization system, in accordance with one embodiment of the present disclosure. In particular, FIG. 1 illustrates a resource request authorization computing system 106 that is operatively coupled, via a network, to a user computing system 103. In such a configuration, the resource request authorization computing system 106 may, in some embodiments, transmit information to and/or receive information from the user computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the user computing system 103 is depicted as a single unit, the system may comprise user computing systems that may each submit requests to and/or receive data from the resource request authorization computing system 106.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the resource request authorization computing system 106 may be a computing system that performs authorization of user requests for the entity's computing resources and/or processes. Accordingly, the resource request authorization computing system 106 may comprise a communication device 152, a processing device 154, and a memory device 156. The resource request authorization computing system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the user computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a resource request authorization application 162, which may comprise computer-executable program code which may instruct the processing device 154 to perform certain logic, data processing, and data storing functions of the application to accomplish the entity's objectives. For instance, the resource request authorization application 162 may allow the entity system to perform the resource request authorization and computing load shifting processes as described elsewhere herein. The resource request authorization application 162 may execute its processes at the firewall or proxy level (e.g., a software level) to control incoming requests from external devices. In other embodiments, the resource request authorization application 162 may execute its processes at a network layer.

In some embodiments, the memory device 156 includes data storage 158 for storing data related to the system environment. In this regard, the data storage 158 may comprise a database 164, which may include various types of data, metadata, executable code, or other types of information or resources to which the user computing system 103 may request access. In an exemplary embodiment, the user computing system 103 may submit a request to download certain data files or perform certain operations on the data files within the database 164. It should be understood that in alternative embodiments, the database 164 may be hosted on a separate computing system (e.g., a database server) instead of being hosted on the resource request authorization computing system 106.

As further illustrated in FIG. 1, the operating environment 100 may further comprise a user computing system 103 in operative communication with the resource request authorization computing system 106. The user computing system 103 may be a computing system that is operated by a user 101, such as an administrator, agent, or employee of the entity. In other embodiments, the user 101 may be a user which is external to the entity, such as a customer or client of the entity. Accordingly, the user computing system 103 may be a device such as a desktop computer, laptop, IoT device, smartphone, tablet, single-board computer, or the like. The user computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 103 may comprise a processing device 134 operatively coupled to a communication device 132 and a memory device 136 having data storage 138 and computer readable instructions 140 stored thereon. The computer readable instructions 140 may comprise an user application 144 which may receive inputs from the user 101 and produce outputs to the user 101. In particular, the user application 144 may be used by the user 101 to submit requests to access certain resources or processes provided by the entity (e.g., via the resource request authorization computing system 106).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for performing authorization of resource requests, in accordance with some embodiments of the present disclosure. The process 200 begins at block 201, where the system receives, from a user computing system, a request to access a resource or process. An entity may offer various resources or processes to be accessed by external users. In an exemplary embodiment, the entity may host various image files on a database that are available externally for download (e.g., by users accessing the entity's website). Accordingly, the user computing system may request to download all of the image files stored within the database. Considering the strain that fulfilling such a request would place on the computing systems of the entity, the system may take additional steps to verify that the request is legitimate and not an attempt to tie up computing resources for unauthorized purposes (e.g., a denial of service attempt).

The process continues to block 202, where the system assesses a magnitude of potential impact of the request to access the resource or process. The system may assess said magnitude along multiple different dimensions. For example, the system may access the load or stress on computing resources (e.g., processing power, networking bandwidth, I/O calls, and the like) on the servers that would be fulfilling the request. The system may also compare the attributes of the resource to be provided against the attributes of the request (e.g., file size, amount of processing required, time to request vs. the time to fulfill, the difficulty of requesting vs. the difficulty in fulfilling, and the like). The system may further set predefined criteria according to the dimensions as described above. For instance, if the system determines that the difficulty (e.g., in computing resources, time spent, or the like) in fulfilling the request is disproportionate to the difficulty in submitting the request, the system may take additional steps before fulfilling the request, as will be described in further detail below.

Continuing the above example, fulfilling the request to transfer all of the images (which may include multiple files having a total file size of multiple megabytes or gigabytes) to the user computing system may place a high amount of strain on the network's computing systems, especially to networking bandwidth and I/O calls on the storage devices on which the images are hosted. Meanwhile, the request itself may be submitted by any external user with access to the website and may only comprise a few lines of text. Accordingly, the system may detect that the difficulty/impact of fulfilling the request is disproportionate to the difficulty of submitting the request. Accordingly, the system may require that additional steps are taken before the request is fulfilled.

The process continues to block 203, where the system, based on the magnitude of potential impact, prompts the user computing system to complete one or more additional authorization steps. The one or more additional authorization steps may be selected by the system to make the difficulty in requesting the resource more proportional to the difficulty in fulfilling the resource. In this regard, the system may increase the difficulty in requesting the resource by prompting the user computing system to perform one or more computations in order to gain access to the resource or process. Continuing the above example, the system may pose a cryptographic challenge that requires the user computing system to perform cryptographic hash computations (e.g., a Proof-of-Work calculation), where the user computing system must compute a value that will, once entered into a specified hash algorithm, produce a hash output that matches predefined criteria set by the system. For example, the system may require that the value of the hash output must begin with a certain number of leading zeroes. The system may increase the required number of leading zeroes to increase the difficulty level of the cryptographic computations and slow down request times, or decrease the required number to reduce difficulty levels and speed up request times. In some embodiments, the system may use the processing of said cryptographic hash computations to redistribute computing loads, as fill be described in further detail below with respect to FIG. 3.

The process continues to block 204, where the system detects that the user computing system has completed the one or more additional authorization steps. Continuing the above example, the system may verify that the user computing system has computed the correct solution to the cryptographic challenge. In this regard, the system may receive the solution from the user computing system, which may be a value that produces a hash output which meets the predefined criteria (e.g., difficulty) as described above. Accordingly, the system may verify the solution by running the solution through the hash algorithm and verifying whether the hash output meets the predefined criteria. If the system determines that the correct solution has not been found by the user computing system, the system may reject the request and prevent the image files from being transferred. However, if the system determines that the correct solution has been reached, the process may continue to block 205, where the system grants the request to access the resource or process. By requiring the user computing system to complete the additional steps as described above, the system may ensure that incoming requests are legitimate, thereby protecting the system against unauthorized or unintentional requests that may impact computing resources and/or disrupt processes.

FIG. 3 illustrates a process flow 300 for redistributing computing loads to external systems, in accordance with one embodiment of the present disclosure. The process begins at block 301, where the system receives, from a user computing system, a request to access a resource or process. The process in FIG. 3 may begin similarly to the process as described in FIG. 2 above. In one embodiment, the entity may wish to redistribute some of the computing tasks of the internal computing systems to external computing systems, such as the user computing system. For example, the system may routinely perform integrity verifications of files stored within its database. In this regard, the system may store hash values associated with each data file, where the hash values represent the data file in its original state or its last modified state that was authorized by the system. To perform the integrity verification, the system may hash each data file and compare the resulting hash output with the stored hash values. If the hash output and the stored hash values match, the system may be confident that the data files have not been altered or corrupted since its last authorized state. By using the process described herein, the system may offload some of the integrity verification checks to external systems, as will be described in further detail below.

The process continues to block 302, where the system prompts the user computing system to compute a set of cryptographic hash values, the set comprising a first subset and a second subset. In an exemplary embodiment, computing the set of cryptographic hash values may involve computing individual hash outputs for 10 different data files stored within the entity's servers. Accordingly, the first subset may comprise 4 of the hash output values, while the second subset may comprise the remaining 6. In this regard, the user computing system may be required to process each data file (all 10) through a hash algorithm and transmit each of the hash output values (10 in total) back to the system for subsequent verification.

The process continues to block 303, where the system computes hash values for the first subset to produce known hash output values. Continuing the above example, the system may compute 4 of the hash output values for verification purposes. Accordingly, 6 of the hash output values (e.g., the second subset) may be unknown to the system.

The process continues to block 304, where the system receives, from the user computing system, the set of cryptographic hash values. Continuing the above example, the user computing system may calculate each of the hash output values for the first subset (e.g., 4 of the hash output values) as well as the second subset (e.g., the remaining 6 hash output values).

The process continues to block 305, where the system compares the set of cryptographic hash values with the known hash output values. In particular, the system may compare each of the first subset of hash output values received from the user computing system with the known values calculated at block 303. If each of the 4 values within the first subset received from the user computing system match with the 4 values computed by the system directly, the system may be confident that the remaining 6 values within the second subset were correctly computed by the user computing system. The system may then use the remaining 6 values for the integrity verification steps as provided above. Thus, rather than using internal systems to directly calculate the values for the second subset, the system may compare the second subset values received from the user computing system with the corresponding stored hash values to perform integrity verification of the associated data files. In this way, the system may save internal computing resources by offloading the processing of certain computations (e.g., calculating hashes for the second subset) to external computing systems, thereby increasing the computing efficiency of the entity system.

The process concludes at block 306, where the system grants the request to access the resource or process. In this way, the system may help prevent unauthorized use of system resources or processes while simultaneously improving the computing efficiency of the entity's computing systems.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authorization of resource requests using cryptographic computations, the system comprising:
   a memory device with computer-readable program code stored thereon;
   a communication device; and
   a processing device operatively coupled to the memory device and the communication device, wherein the processing device is configured to execute the computer-readable program code to:
   receive, from a user computing system, a request to access a resource or process;
   assess a magnitude of potential impact of the request to access the resource or process;
   based on the magnitude of potential impact, prompt the user computing system to complete one or more authorization steps;
   detect that the user computing system has completed the one or more authorization steps,
   wherein prompting the user computing system to complete the one or more authorization steps comprises prompting the user computing system to compute a set of cryptographic hash values, the set comprising a first subset and a second subset, wherein the detecting that the user computing system has completed the one or more authorization steps comprises:
   computing hash values for the first subset to produce known hash output values;
   receiving, from the user computing system, the set of cryptographic hash values; and
   comparing the set of cryptographic hash values with the known hash output values;
   perform integrity verification of one or more data files by comparing the set of cryptographic hash values with one or more corresponding stored hash values; and
   grant the request to access the resource or process.

2. The system according to claim 1, wherein the one or more authorization steps comprises computing a solution to a cryptographic challenge, wherein the detecting that the user computing system has completed the one or more authorization steps comprises:
   receiving the solution from the user computing system;
   inputting the solution into a hash algorithm to generate a hash output; and
   verifying that the hash output satisfies a set of criteria for the cryptographic challenge.

3. The system according to claim 2, wherein the set of criteria for the cryptographic challenge comprises a requirement that a value of the hash output is lower than a predefined threshold.

4. The system according to claim 1, wherein the computer-readable program code further causes the processing device to prompt a user associated with the user computing system to complete an additional authorization step.

5. The system according to claim 1, wherein the computer-readable program code further causes the processing device to scale a difficulty of the one or more authorization steps depending on a difficulty of granting the request to access the resource or process.

6. A computer program product for authorization of resource requests using cryptographic computations, the computer program product comprising at least one non-transitory computer readable medium having computer-readable program code portions embodied therein, the computer-readable program code portions comprising executable code portions for:
   receiving, from a user computing system, a request to access a resource or process;
   assessing a magnitude of potential impact of the request to access the resource or process;
   based on the magnitude of potential impact, prompting the user computing system to complete one or more authorization steps;
   detecting that the user computing system has completed the one or more authorization steps, wherein prompting the user computing system to complete the one or more authorization steps comprises prompting the user computing system to compute a set of cryptographic hash values, the set comprising a first subset and a second subset, wherein the detecting that the user computing system has completed the one or more authorization steps comprises:
- computing hash values for the first subset to produce known hash output values;
- receiving, from the user computing system, the set of cryptographic hash values; and
- comparing the set of cryptographic hash values with the known hash output values;

performing integrity verification of one or more data files by comparing the set of cryptographic hash values with one or more corresponding stored hash values;
and
granting the request to access the resource or process.

7. The computer program product according to claim 6, wherein the one or more authorization steps comprises computing a solution to a cryptographic challenge, wherein the detecting that the user computing system has completed the one or more authorization steps comprises:
- receiving the solution from the user computing system;
- inputting the solution into a hash algorithm to generate a hash output; and
- verifying that the hash output satisfies a set of criteria for the cryptographic challenge.

8. The computer program product according to claim 7, wherein the set of criteria for the cryptographic challenge comprises a requirement that a value of the hash output is lower than a predefined threshold.

9. The computer program product according to claim 6, wherein the computer-readable program code portions further comprise executable code portions for prompting a user associated with the user computing system to complete an additional authorization step.

10. A computer-implemented method for authorization of resource requests using cryptographic computations, wherein the method comprises:
- receiving, from a user computing system, a request to access a resource or process;
- assessing a magnitude of potential impact of the request to access the resource or process;
- based on the magnitude of potential impact, prompting the user computing system to complete one or more authorization steps;
- detecting that the user computing system has completed the one or more authorization steps,
wherein prompting the user computing system to complete the one or more authorization steps comprises prompting the user computing system to compute a set of cryptographic hash values, the set comprising a first subset and a second subset, wherein the detecting that the user computing system has completed the one or more authorization steps comprises:
  - computing hash values for the first subset to produce known hash output values;
  - receiving, from the user computing system, the set of cryptographic hash values; and
  - comparing the set of cryptographic hash values with the known hash output values;
perform integrity verification of one or more data files by comparing the set of cryptographic hash values with one or more corresponding stored hash values;
and
granting the request to access the resource or process.

11. The computer-implemented method according to claim 10, wherein the one or more authorization steps comprises computing a solution to a cryptographic challenge, wherein the detecting that the user computing system has completed the one or more authorization steps comprises:
- receiving the solution from the user computing system;
- inputting the solution into a hash algorithm to generate a hash output; and
- verifying that the hash output satisfies a set of criteria for the cryptographic challenge.

12. The computer-implemented method according to claim 11, wherein the set of criteria for the cryptographic challenge comprises a requirement that a value of the hash output is lower than a predefined threshold.

13. The computer-implemented method according to claim 10, the method further comprising prompting a user associated with the user computing system to complete an additional authorization step.

14. The computer-implemented method according to claim 10, the method further comprising scaling a difficulty of the one or more authorization steps depending on a difficulty of granting the request to access the resource or process.

* * * * *